(12) United States Patent
Iba (10) Patent No.: US 12,102,496 B2
(45) Date of Patent: Oct. 1, 2024

(54) ANGLE ADJUSTMENT STAGE DEVICE FOR DENTAL TECHNIQUE

(71) Applicant: Nobuyuki Iba, Kyoto (JP)

(72) Inventor: Nobuyuki Iba, Kyoto (JP)

( * ) Notice: Subject to any disclaimer, the term of this patent is extended or adjusted under 35 U.S.C. 154(b) by 510 days.

(21) Appl. No.: 17/442,735

(22) PCT Filed: Mar. 28, 2019

(86) PCT No.: PCT/JP2019/013820
§ 371 (c)(1),
(2) Date: Sep. 24, 2021

(87) PCT Pub. No.: WO2020/194721
PCT Pub. Date: Oct. 1, 2020

(65) Prior Publication Data
US 2022/0218451 A1 Jul. 14, 2022

(51) Int. Cl.
*A61C 13/36* (2006.01)
*A61C 13/01* (2006.01)

(52) U.S. Cl.
CPC .......... *A61C 13/1016* (2013.01); *A61C 13/01* (2013.01)

(58) Field of Classification Search
CPC ... A61C 13/1016; A61C 13/01; A61C 19/055; A61C 19/04
See application file for complete search history.

(56) References Cited

U.S. PATENT DOCUMENTS

2009/0053670 A1* 2/2009 Koide .................... A61C 11/06
433/56

FOREIGN PATENT DOCUMENTS

JP 6150093 B 6/2017
WO 2004/014252 A1 2/2004
(Continued)

OTHER PUBLICATIONS

International Search Report for corresponding Application No. PCT/JP2019/013820, mailed Jul. 2, 2019.

*Primary Examiner* — Jacqueline T Johanas
*Assistant Examiner* — Drew S Folgmann
(74) *Attorney, Agent, or Firm* — Renner, Otto, Boisselle & Sklar, LLP (57) ABSTRACT

A base shaft 4 with a built-in magnet is rotatably projected on a base 1. A rocking body 7 has a square substrate 8, a sphere 9, a sphere holder 10 rotatable around an axis which extends through the center of the substrate and perpendicular to the substrate, and a stopper for fixing the sphere holder at a desired rotational position. The sphere holder holds the sphere in such a way that the sphere is fixed at a desired rotational position. A stage is attached to the sphere through a support rod 20. A lower portion of the sphere protrudes downward from the sphere holder and substrate. The rocking body is magnetically coupled to the base shaft at a lower end of the sphere. An elevating body 21 is fitted on the base shaft and fixed by a set collar 22 at a desired height. The elevating body has a recess for receiving the lower portion of the sphere. The rocking body takes a horizontal position when the elevating body is brought into contact with the substrate of the rocking body, but takes a tilt position when a side of the substrate is brought into contact with an upper surface of the elevating body after the elevating body is lowered. An angle display mechanism 23 displays a tilt angle at the tilt position of the rocking body depending on the height of the elevating body.

6 Claims, 9 Drawing Sheets

(56) References Cited

FOREIGN PATENT DOCUMENTS

WO     2007/032484   A1     3/2007
WO     2017/065278   A1     4/2017

\* cited by examiner

ANGLE ADJUSTMENT STAGE DEVICE FOR DENTAL TECHNIQUE

TECHNICAL FIELD

The present invention relates to an angle adjustment stage device for dental technique, particular to, an angle adjustment stage device used in design of a hook and a base of a removable partial denture for replacement of missing teeth.

BACKGROUND ART

Figure 8:
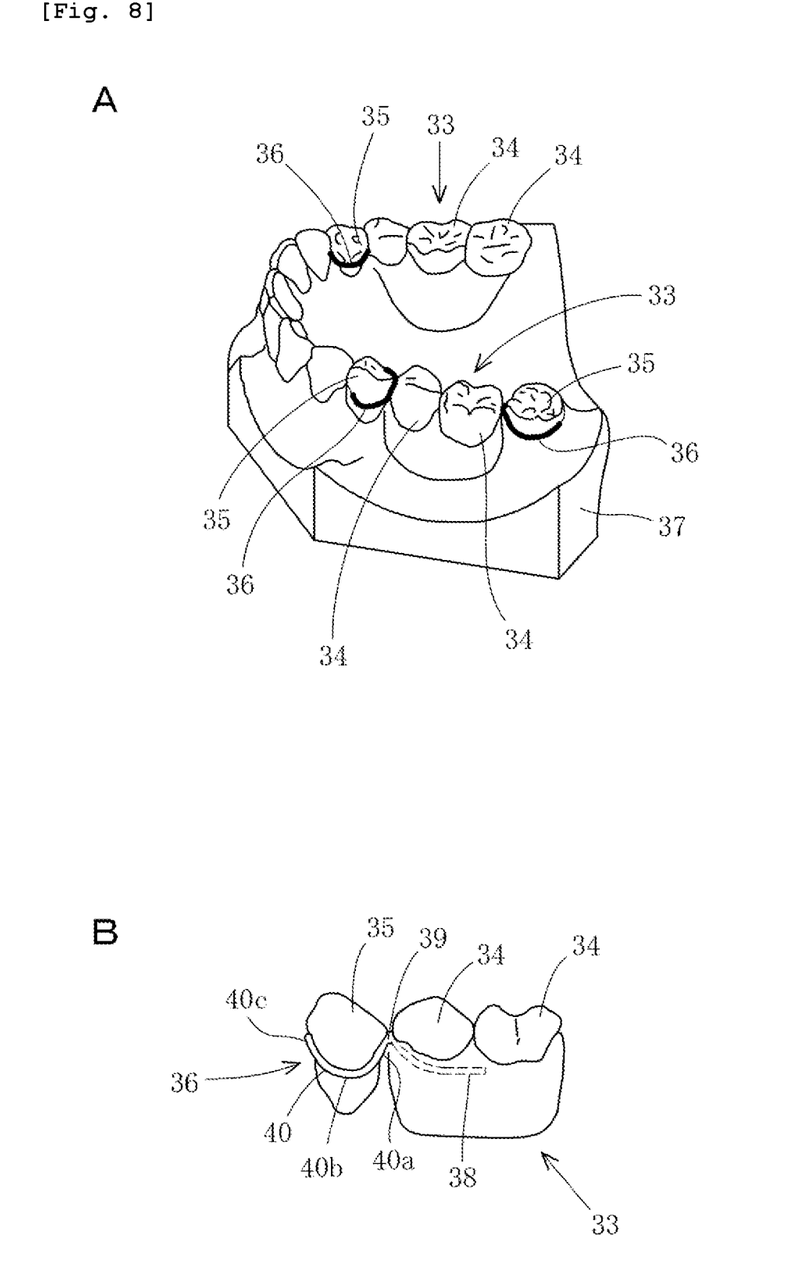
FIG. 8 is a perspective view illustrating a plaster model to which a removable partial denture is attached.

FIG. 8 is a perspective view of an example of a removable partial denture mounted on a plaster model.

As shown in FIGS. 8(A) and 8(B), the removable partial dentures 33 comprise artificial teeth 34 and clasps 36 engaged with clasped teeth 35 adjacent to the removable partial dentures 33.

In manufacturing process of the removable partial denture 33, firstly, a plaster model 37 is made by modeling target teeth and mucous membranes from a patient's mouth cavity, and the clasped teeth 35 for the removable partial dentures 33 are chosen from residual teeth of the plaster model 37, and then the clasps 36 are designed and produced in such a way that they fit the curved surfaces of the clasped teeth 35.

There are two types of clasps 36, that is, a wire clasp which is made by bending a metal wire and a cast clasp which is made by casting alloys.

As shown in FIG. 8(B), the clasp 36 is composed of a clasp tang 38 embedded into the removable partial denture 33 so as to be integrated with the removable partial denture 33, a clasp body 39 connected to the clasp tang 38 and engaging with an adjacent surface of the clasped tooth 35, and a clasp arm 40 connected to the clasp body 39 and surrounding the clasped tooth 35 at an undercut area of the clasped teeth 35 (an area underside of a circumferential line (surveyor line) of the tooth). The clasp arm 40 is composed of an upper arm portion 40a, a middle arm portion 40b and clasp tip 40c in order closest to the clasp body 39.

When the removable partial denture 33 is mounted on a defective part of teeth, the clasp arm 40, which extends from the removable partial denture 33 in such a manner that it surrounds the clasped tooth 35, engages with the undercut area of the clasped tooth 35 so as to prevent the removable partial denture 33 from disengaging and wobbling.

In this case, the setting of the degree of bending of the clasp arm 40 is very important for design and production of the clasp 36, and therefore, one of the important design items of the removable partial denture 33 because the amount of the clasp arm's bending into the undercut area has a huge effect on comfort and load on the clasped tooth 35 when wearing the removable partial denture 33, and aesthetics of the removable partial denture 33.

The inventor of the present invention has proposed "IBA Denture Design Method" as a wire clasp design method.

Figure 9:
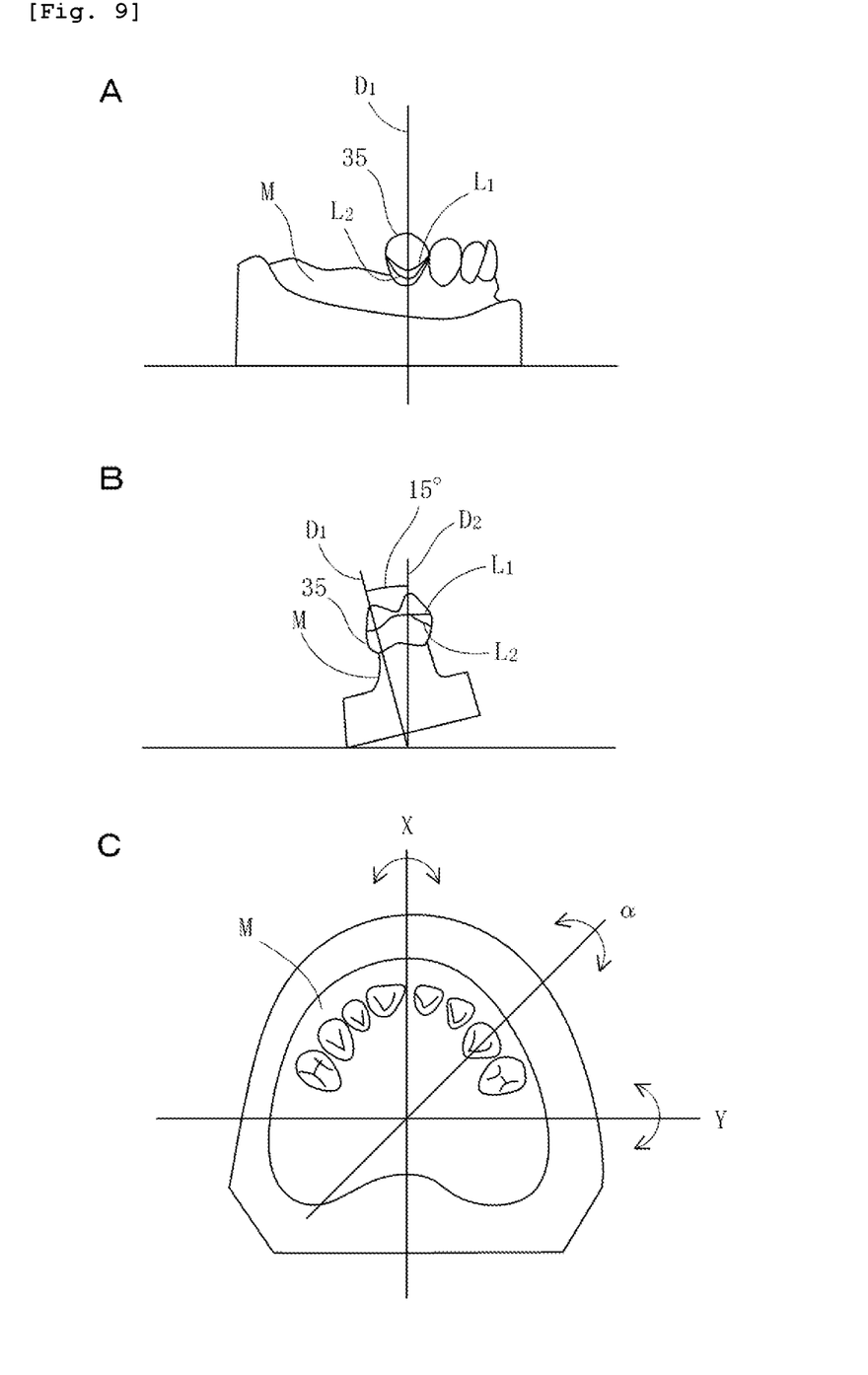
FIG. 9 is a view explaining how to design a wire clasp according to the IBA Denture Design Method, wherein (A) is a side view of a plaster model as viewed from the buccal side, (B) is a cross-sectional view taken along Dl of (A), and (C) is a plan view of the plaster model.

According to this method, as shown in FIGS. 9(A) and 9(B), a plaster model M is set on an initial setting position (see FIG. 9(A). a straight line D1 indicates a vertical direction), and a baseline (circumferential line) L1 is drawn on the plaster model M, and each time the plaster model M is rotated to buccal and lingual sides by a predetermined angle (usually 15 degrees), an inclined line (outline of clasp) L2 is drawn on a side of the clasped tooth 35 (see FIG. 9(B). a straight line D2 indicates a vertical direction). After that, the buccal and lingual sides balance between the baseline and the outline of clasp is checked, and when the balance is not good, the initial setting position of the plaster model M is changed (adjusted) and a new outline of clasp is drawn again. According to this method, the wire clasp is designed in a manner such that a whole of the clasp arm (the clasp tip, the middle arm portion and the upper arm portion) is located in the undercut area.

In "IBA Denture Design Method", it is necessary to draw the line of clasp arm while tilting the plaster model from the initial setting position, and therefore, some of angle adjustment stage devices for supporting design of wire clasp according to this method have been proposed in the prior art.

As an angle adjustment stage device of this kind, for example, there is an angle adjustment stage device comprising a first rotary member attached to a support post on a base so as to be rotatable around a horizontal axis, and a second rotary member arranged in an interior space of the first rotary member so as to be rotatable around an axis perpendicular to the horizontal axis, the first rotary member being fixed to the support post at a desired rotational position, the second rotary member being fixed to the first rotary member at a desired rotational position. The angle adjustment stage device further comprises a universal joint mechanism attached to the second rotary member in a manner such that a rotational center of the universal joint mechanism is located on a vertical axis, a support rod connected to the second rotary member through the universal joint mechanism at lower end thereof, a stage connected to an upper end of the support rod, a means (third fixing means) for fixing the support rod at a desired tilt position, and a means (fourth fixing means) for fixing the support rod after rotating the support rod from the desired tilt position around an axis which is chosen from the horizontal axis and axes parallel to the horizontal axis and passes through the rotational center of the universal joint by a desired angle (see Patent Document 1).

According to this angle adjustment stage device, the number of both a rotary part and a part for fixing the rotational position is reduced so that the simplification of device, the reduction of manufacturing costs and the improved operability of the device can be achieved to some extent.

However, this angle adjustment stage device is still expensive and is not easy to maintain. In addition, it takes a long time to get familiar with the operation of the device.

That is to say, there is still plenty of room for simplification of the configuration and improvement of the operability in this angle adjustment stage device.

PRIOR ART DOCUMENTS

Patent Documents

Patent Document 1: JP 6150093 B

SUMMARY OF THE INVENTION

Problems to be Solved by the Invention

It is, therefore, an object of the present invention to provide an angle adjustment stage device with a simpler structure and excellent operability.

Means for Solving the Problems

In order to solve the object, the present invention provides an angle adjustment stage device for dental technique comprising: a base; a stage arranged above the base, a workpiece for dental technique being fixed on the stage; and a stage support mechanism provided on the base to support the stage in a manner such that a tilt angle of the stage is adjustable. The stage support mechanism includes a base shaft arranged in protruding manner on the base and having a magnet therein, and a rocking body magnetically coupled to the tip of the base shaft. The rocking body includes a square substrate, a sphere formed from ferromagnet, a sphere holder arranged at the center of the substrate so as to be rotatable around an axis which extends through the center of the substrate and perpendicular to the substrate, and a first stopper for fixing the sphere holder to the substrate at a desired rotational position, the sphere holder holding the sphere in a manner such that the sphere can be rotated around the center thereof and fixed at a desired rotational position while the center of the sphere is on the axis extending perpendicular to the substrate. The rocking body further includes a support rod extending radially outward form the sphere and connected to a lower surface of the stage at an upper end thereof, a lower portion of the sphere protruding from the underside of each of the sphere holder and the substrate, the rocking body being magnetically coupled to a receiving portion of the tip of the base shaft at a lower end of the sphere. The stage support mechanism further includes an elevating body fitted on the base shaft so as to vertically slide along the base shaft, and a second stopper attached to the elevating body and/or the base shaft for fixing the elevating body to the base shaft at a desired height. An upper surface of the elevating body forms a horizontal plane and has a recess for receiving the lower portion of the sphere, and a through hole is formed on a bottom surface of the recess to reach a lower surface of the elevating body, and the through hole has a diameter corresponding to a diameter of the base shaft so that the base shaft is inserted through the through hole. The rocking body takes a horizontal position when the elevating body is located at the highest point to contact a lower surface of the substrate of the rocking body at an upper surface thereof, while the rocking body takes a tilt position when one of four sides of the substrate is brought into contact with the upper surface of the elevating body after the elevating body is lowered from the highest point while separating the upper surface thereof from the lower surface of the substrate. The angle adjustment stage device for dental technique further comprises an angle display mechanism displaying a tilt angle at the tilt position of the rocking body depending on the height of the elevating body.

According to a preferred embodiment of the present invention, a first circular recess is formed at the center of the lower surface of the substrate of the rocking body, and a first circular opening whose diameter is larger than a diameter of the sphere is formed at the center of a bottom surface of the first circular recess to reach an upper surface of the substrate. The sphere holder of the rocking body comprises a holder body having a large diameter portion whose diameter is larger than the diameter of the first circular opening, and a small diameter portion connecting coaxially to a lower end surface of large diameter portion and having a thickness which corresponds to a depth of the first circular opening and a diameter which corresponds to the diameter of the first circular opening. A second circular recess whose diameter is larger than the diameter of the sphere is formed at the center of an upper end surface of the large diameter portion, and a second circular opening is formed at the center of a bottom surface of t he second circular recess to reach a lower end surface of the small diameter portion and having a diameter which is smaller than the diameter of the sphere. The sphere holder further comprises an annular member having a thickness which is smaller than a depth of the first circular recess, an outer diameter which is larger than the diameter of the first circular opening, but smaller than the diameter of the first circular recess and an inner diameter which corresponds to the diameter of the second circular opening. The annular member is combined coaxially with the lower end surface of the small diameter portion while the small diameter portion is fitted into the first circular opening of the substrate, and the holder body is attached to the substrate so as to be rotatable around the axis extending perpendicular to the substrate. The sphere holder further comprises an annular sphere holding member having an outer diameter which equals to the diameter of the first circular opening and an inner diameter which is smaller than the diameter of the sphere. First screw holes are formed at more than three positions which are spaced from each other in a circumferential direction of the sphere holding member so as to penetrate both end surfaces of the sphere holding member, while second screw holes are formed at positions corresponding to the first screw holes on a bottom surface of the second circular recess of the holder body. The sphere holding member further comprises fixing screws being screwed into the first and second screw holes, the fixing screws being screwed into the first and second screw holes from the outside of the sphere holding member with the sphere nipped between the bottom surface of the second circular recess of the holder body and the sphere holding member.

According to another preferred embodiment of the present invention, a plurality of recesses are formed on an outer peripheral surface of the small diameter portion of the holder body at equal distances, and at least one radial hole is formed at positions which correspond to the plurality of recesses on an inner wall of the first circular opening of the substrate and extends radially outward from the axis extending perpendicular to the substrate, and the first stopper consists of at least one ball plunger arranged in the at least one radial hole and elastically urged toward the outer peripheral surface of the small diameter portion to engage with the plurality of recesses of the small diameter portion.

According to further preferred embodiment of the present invention, the base shaft is rotatable around an axis thereof and has a flange at a lower portion thereof. The angle display mechanism includes a pair of fan-shaped plates are connected to each other so as to be rotatable around the center of each other. The tip of a radial side edge of a first fan-shaped plate of the pair of fan-shaped plates or an extension extending outward from the first fan-shaped plate along the radial side edge is attached to the flange of the base shaft so as to be rotatable around a horizontal axis. The tip of a radial side edge of a second fan-shaped plate of the pair of fan-shaped plates closer to the radial side edge of the first fun-shaped plate or an extension extending outward from the second fan-shaped plate along the radial side edge of the second fan-shaped plate is attached to a side wall of the elevating body so as to be rotatable around an axis parallel to the horizontal axis, so that the pair of fan-shaped plates rotate around the center of each other in a vertical plane as the elevating body moves up and down. An angle scale which corresponds to the tilt angle of the rocking body is attached on a peripheral wall of the first fan-shaped plate, and a zero point scale is attached on a peripheral wall of the second fan-shaped plate.

According to further preferred embodiment of the present invention, the base shaft is fixed to the base, and the angle display mechanism includes a pair of fan-shaped plates connected to each other so as to be rotatable around the center of each other. The tip of a radial side edge of a first fan-shaped plate of the pair of fan-shaped plates or an extension extending outward from the first fan-shaped plate along the radial side edge is attached to the base so as to be rotatable around a horizontal axis. The tip of a radial side edge of a second fan-shaped plate of the pair of fan-shaped plates closer to the radial side edge of the first fun-shaped plate or an extension extending outward from the second fan-shaped plate along the radial side edge of the second fan-shaped plate is attached to a side wall of the elevating body so as to be rotatable around an axis parallel to the horizontal axis, so that the pair of fan-shaped plates rotate around the center of each other in a vertical plane as the elevating body moves up and down. An angle scale which corresponds to the tilt angle of the rocking body is attached on a peripheral wall of the first fan-shaped plate, and a zero point scale is attached on a peripheral wall of the second fan-shaped plate.

According to further preferred embodiment of the present invention, the angle adjustment stage device for dental technique further comprises a marking unit attached to the base so as to draw a line for design on the workpiece for dental technique fixed on the stage. The marking unit includes a pole projected vertically on the base, an arm attached to the pole and extending radially from the pole and arranged on a plane perpendicular to the pole so as to be rotatable around an axis of the pole, a pen holder attached to the tip of the arm, and a pen held by the pen holder and extending downward from the pen holder and parallel to the pole.

Effect of the Invention

According to the present invention, compared with the conventional angle adjustment stage device, the number of parts which make up the angle adjustment stage device is reduced, and the device configuration becomes easier, thereby device manufacturing costs are significantly reduced and the device can be miniaturized and the maintenance of the device also becomes easier.

Furthermore, the number of parts to be operated for adjusting the angle of the stage is reduced and it is easy to operate those parts, and therefore, even beginners can master the operation of the device in a short period of time.

BEST MODE FOR CARRYING OUT THE INVENTION

A preferred embodiment of the present invention will be explained below with reference to accompanying drawings.

Figure 1:
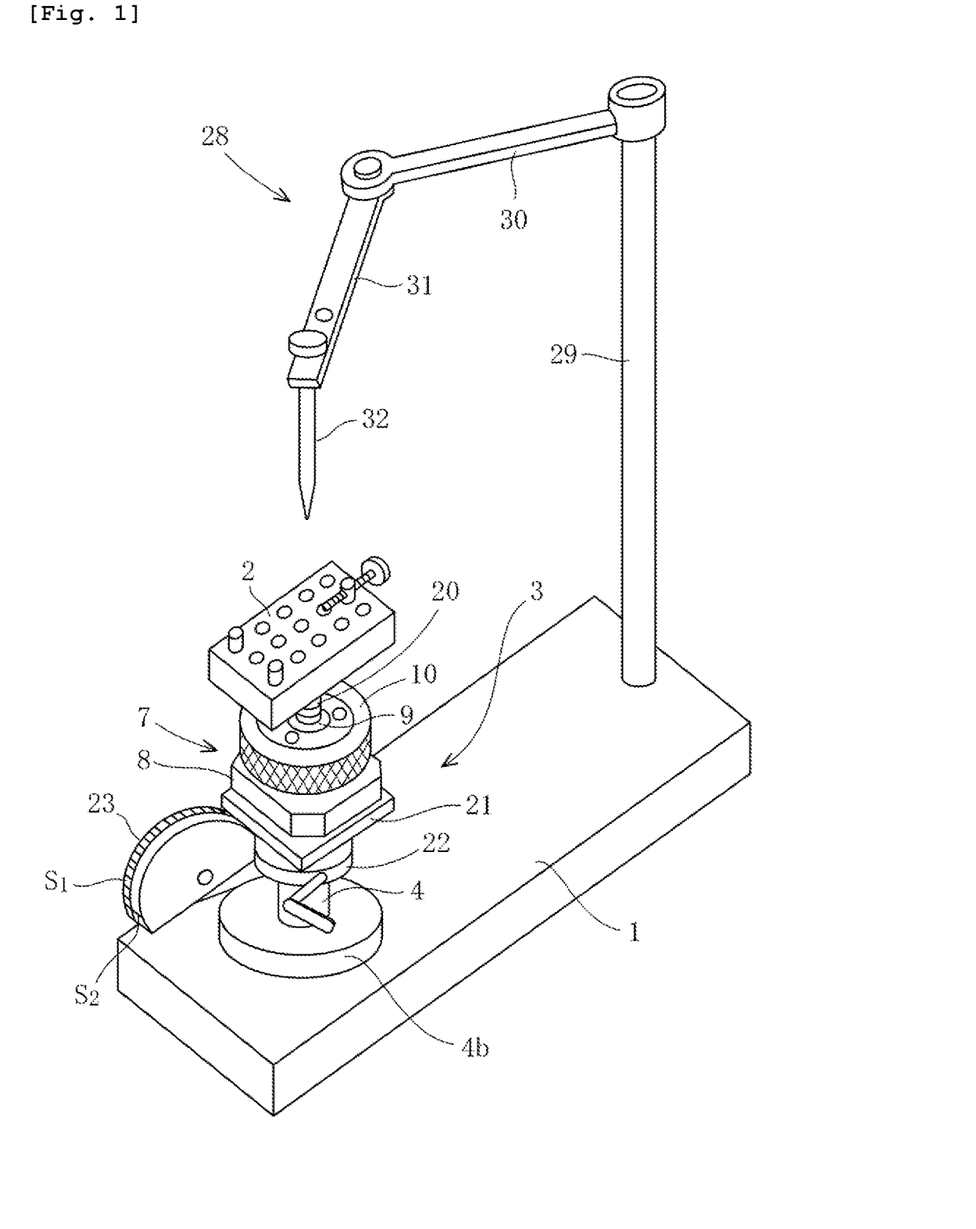
FIG. 1 is a perspective view of an angle adjustment stage device for dental technique according to an embodiment of the present invention.
Figure 2:
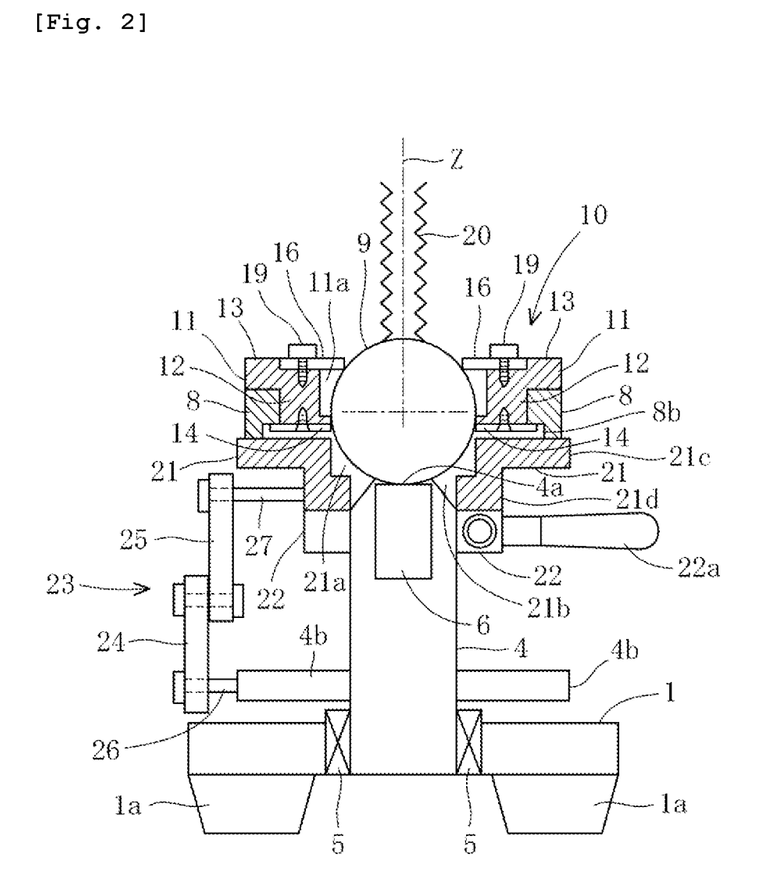
FIG. 2 is a longitudinal section a stage support mechanism of the angle adjustment stage device for dental technique shown in FIG. 1.
Figure 3:
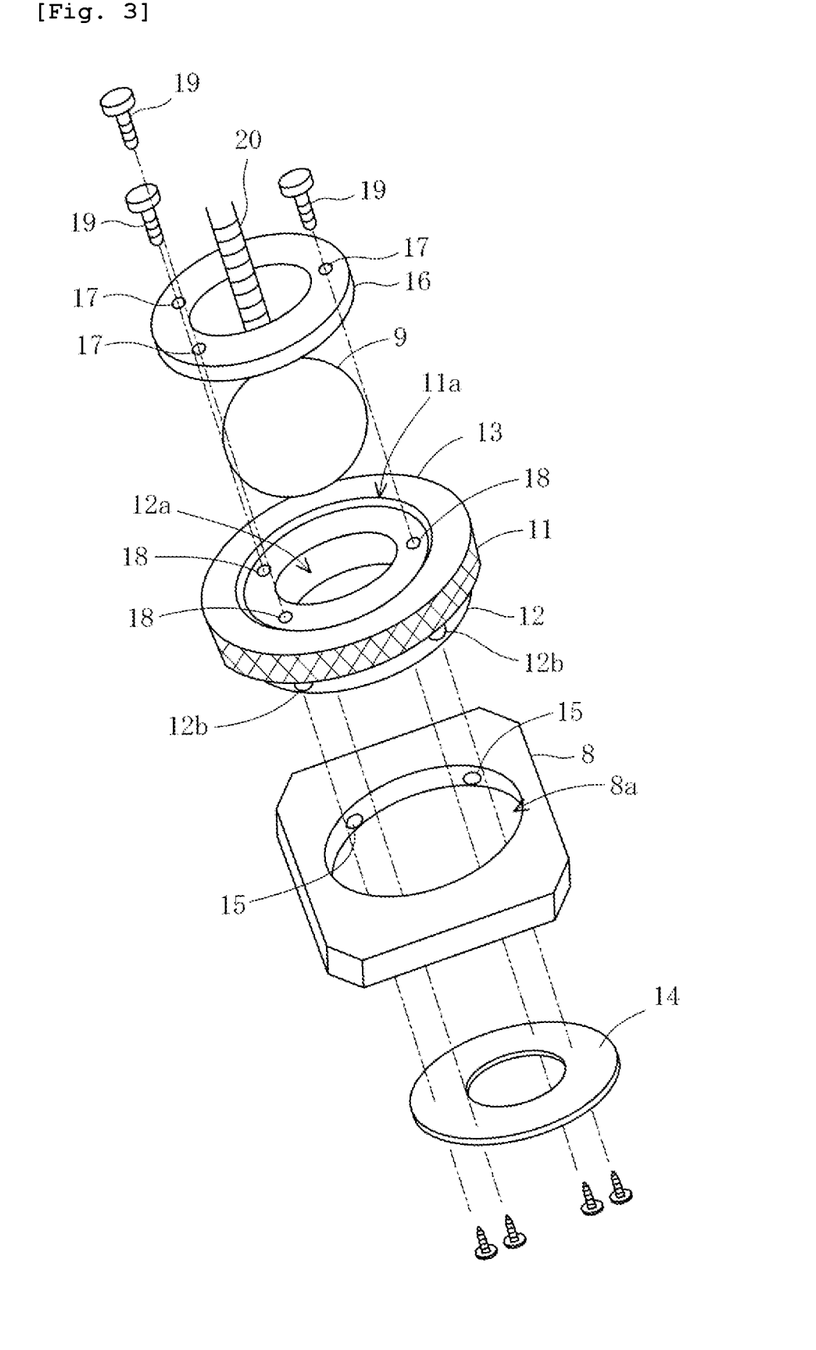
FIG. 3 is a disassembled perspective view of a rocking body of the angle adjustment stage device for dental technique shown in FIG. 1.
Figure 4:
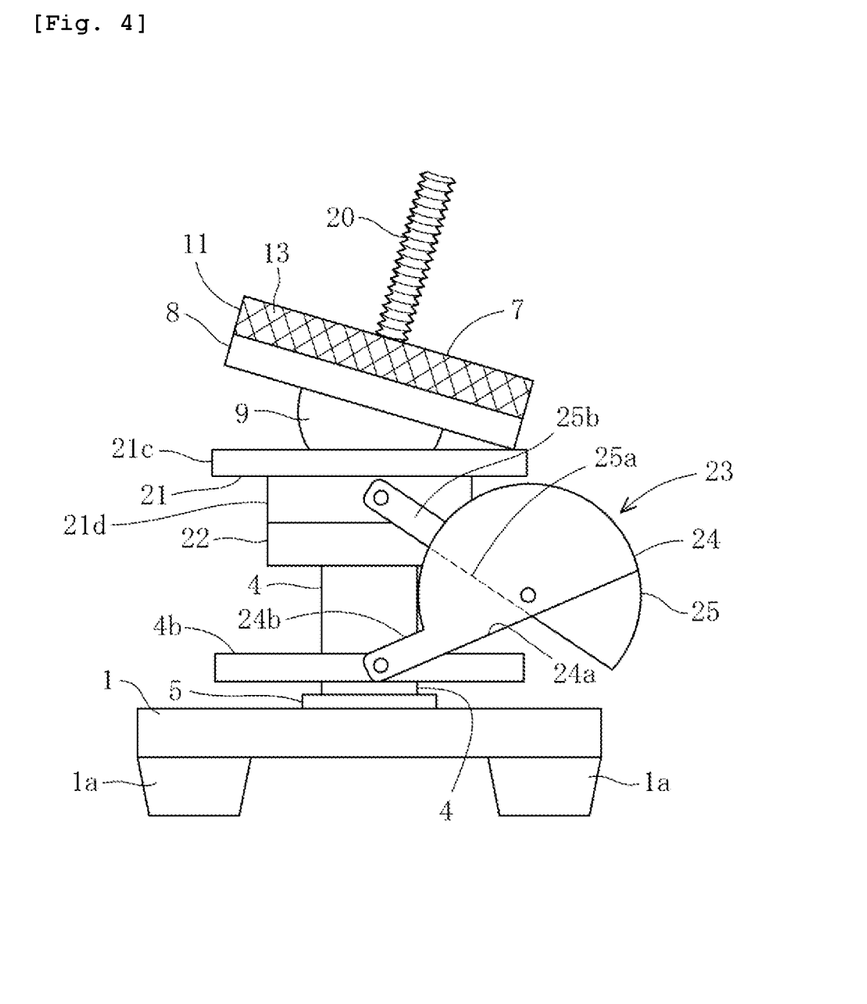
FIG. 4 is a side view of the angle adjustment stage device for dental technique shown in FIG. 1.

FIG. 1 is a perspective view of an angle adjustment stage device for dental technique according to an embodiment of the present invention, and FIG. 2 is a longitudinal section a stage support mechanism of the angle adjustment stage device for dental technique shown in FIG. 1. FIG. 3 is a disassembled perspective view of a rocking body of the angle adjustment stage device for dental technique shown in FIG. 1, and FIG. 4 is a side view of the angle adjustment stage device for dental technique shown in FIG. 1.

Referring to FIG. 1, an angle adjustment stage device of the present invention comprises a base 1, a stage 2 arranged above the base 1, a workpiece W for dental technique being fixed on the stage 2, and a stage support mechanism 3 provided on the base 1 to support the stage 2 in a manner such that a tilt angle of the stage 2 is adjustable, In this embodiment, the base 1 has a rectangular plate shape, and rubber legs la are attached to four corners of the underside of the base 1.

As shown in FIG. 2, the stage support mechanism 3 includes a base shaft 4 arranged in protruding manner on the base through a thrust bearing 5 to be rotatable around an axis of the base shaft 4.

The base shaft 4 has a magnet 6 therein, and an upper end surface of the magnet 6 is exposed on a bottom surface of a receiving portion 4a which is formed at the tip of the base shaft 4 so as to receive a sphere 9 (described later).

The base shaft also has a flange 4b at a lower portion thereof.

The stage support mechanism 3 further includes a rocking body 7 magnetically coupled to the tip of the base shaft 4 (receiving portion 4a).

The rocking body 7 includes a square substrate 8, a sphere 9 formed from ferromagnet, and a sphere holder 10 arranged at the center of the substrate 8 so as to be rotatable around an axis Z which extends through the center of the substrate 8 and perpendicular to the substrate 8.

Referring to FIGS. 2 and 3, a first circular recess 8b is formed at the center of a lower surface of the substrate 8 and a first circular opening 8a whose diameter is larger than a diameter of the sphere 9 is formed at the center of a bottom surface of the first circular recess to reach an upper surface of the substrate 8.

In this embodiment, the sphere holder 10 comprises an holder body 13 having a large diameter portion 11 whose diameter is larger than the diameter of the first circular opening 8a, and a small diameter portion 12 connecting coaxially to a lower end surface of large diameter portion 11 and having a thickness which corresponds to a depth of the first circular opening 8a and a diameter which corresponds to the diameter of the first circular opening 8a.

A second circular recess 11a whose diameter is larger than the diameter of the sphere 9 is formed at the center of an upper end surface of the large diameter portion 11, and a second circular opening 12a is formed at the center of a bottom surface of the second circular recess 11a to reach a lower end surface of the small diameter portion 12 and having a diameter which is smaller than the diameter of the sphere 9.

The sphere holder 10 further comprises an annular member 14 having a thickness which is smaller than a depth of the first circular recess 8b, an outer diameter which is larger than the diameter of the first circular opening 8a, but smaller than the diameter of the first circular recess 8b and an inner diameter which corresponds to the diameter of the second circular opening 12a.

The annular member 14 is concentrically attached to the lower end surface of the small diameter portion 12 through screws, while the small diameter portion 12 of the holder body 13 is fitted into the first circular opening 8a of the substrate 12, and thereby the holder body 13 is attached to the substrate 8 so as to be rotatable around the axis Z.

As can be seen from FIG. 3, a plurality of recesses (in this embodiment, four recesses) 12b are formed on an outer peripheral surface of the small diameter portion 12 at equal distances, and radial holes (not shown) are formed at positions corresponding to the plurality of recesses on an inner wall of the first circular opening 8a of the substrate 8 and extend radially outward from the axis Z of the substrate 8.

A ball plunger 15 is arranged in each of the radial holes and always elastically urged toward the outer peripheral surface of the small diameter portion 12.

The ball plungers 15 constitute a first stopper for fixing the sphere holder 10 to the substrate 8 of the rocking body 7 at a desired rotational position.

A configuration of the first stopper is not limited to this embodiment.

In this embodiment, although the ball plungers 15 engage with the recesses 12b of the small diameter portion 12 every time the sphere holder 10 rotates 90 degrees, the reference position of the workpiece W fixed on the stage 2 is defined by one rotational position at which the ball plungers 15 engage with the recesses 12b (this will be described later).

The sphere holder 10 also comprises an annular sphere holding member 16 having an outer diameter which equals to the diameter of the first circular opening 8a and an inner diameter which is smaller than the diameter of the sphere 9.

First screw holes 17 are formed at more than three positions which are spaced from each other in a circumferential direction of the sphere holding member 16 so as to penetrate both end surfaces of the sphere holding member 16, while second screw holes 18 are formed at positions corresponding to the first screw holes 17 on a bottom surface of the second circular recess 11a of the holder body 13.

The sphere holder 10 further comprises fixing screws 19 being screwed into the first and second screw holes 17, 18.

The fixing screws 19 are screwed into the first and second screw holes 17, 18 from the outside of the sphere holding member 16 while the sphere 9 whose center is on the axis Z extending perpendicular to the substrate 8 is nipped between the bottom surface of the second circular recess 11a of the holder body 13 and the sphere holding member 16 with a lower portion of the sphere 9 protruding from the underside of each of the sphere holder 10 and the substrate 8.

Thus the sphere 9 becomes rotatable while being magnetically coupled to the receiving portion 4b by loosening the fixing screws 19, and the sphere 9 is fixed between the bottom surface of the second circular recess 11a of the holder body 13 and the sphere holding member 16 by tightening the fixing screws 19.

The rocking body 7 further includes a support rod 20 extending radially outward form the sphere 9. A lower surface of the stage 2 is connected to an upper end of the support rod 20.

The rocking body 7 is magnetically coupled to the receiving portion 4a (magnet 6) of the tip of the base shaft 4 at a lower end of the sphere 9.

In this case, the magnet 6 has a magnetic force which causes a magnetic coupling force large enough to maintain positional relationship of the sphere 9 with respect to the receiving portion 4a.

The stage support mechanism 3 also includes an elevating body 21 fitted on the base shaft 4 so as to vertically slide along the base shaft 4.

The elevating body 21 is composed of a rectangular (or square) flat upper portion 21c and a columnar lower portion 21d concentrically connecting to the center of the underside of the upper portion 21c.

An upper surface of the upper portion 21c forms a horizontal plane, and an recess 21a for receiving the lower portion (portion protruding from the underside of each of the substrate 8 and the sphere holder 10) of the sphere 9 opens on the upper surface of the upper portion 21c, and a through hole 21b is formed on a bottom surface of the recess 21a to reach the underside of elevating body 21. The through hole 21b has a diameter corresponding to a diameter of the base shaft 4.

A set collar 22 whose inner diameter corresponds to the through hole 21b is attached to the underside of the elevating body 21, and the base shaft 4 is inserted through the through hole 21b and the set collar 22.

Thus the elevating body 21 becomes slidably along the base shaft 4 by loosening a clamp screw 22a, and the elevating body 21 is fixed to the base shaft 4 at a desired height by tightening the clamp screw 22a.

The set collar 22 constitutes a second stopper for fixing the elevating body 21 to the base shaft 4 at a desired height.

A configuration of the second stopper is not limited to this embodiment.

In this way, the rocking body 7 takes a horizontal position when the elevating body 21 is located at the highest point to contact the lower surface of the substrate 8 of the rocking body 7 at an upper surface thereof (see FIG. 2), while the rocking body 7 takes a tilt position when one of four sides of the substrate 8 is brought into contact with the upper surface of the elevating body 21 after the elevating body 21 is lowered from the highest point while separating the upper surface thereof from the lower surface of the substrate 8 (see FIG. 4).

In this case, when the rocking body 7 is located at the horizontal position, the axis Z coincides with a vertical axis (axis perpendicular to the upper surface of the elevating body 21) (see FIG. 2), wherein the stage 2 (support rod 20)can be tilted through the sphere 9 by loosening fixing screws 19, while the stage 2 (support rod 20) can be fixed at a desired tilt position by tightening the fixing screws 19.

When the rocking body 7 is located at the tilt position while the stage 2 (support rod 20) is fixed at a desired tilt position, the stage 2 (support rod 20) can be rotated by the tilt angle of the rocking body 7 clockwise or counterclockwise around one of horizontal two axes (X-Y axes) which extend through the center of the sphere 9 and are orthogonal to each other on a vertical axis.

The angle adjustment stage device for dental technique of the present invention further comprises an angle display mechanism 23 displaying the tilt angle at the tilt position of the rocking body 7 depending on the height of the elevating body 21.

As shown in FIGS. 2 and 4, in this embodiment, the angle display mechanism 23 includes a pair of fan-shaped plates 24, 25 connected to each other so as to be rotatable around the center of each other.

A first fan-shaped plate 24 of the pair of fan-shaped plates 24, 25 has an extension 24b extending outward from the first fan-shaped plate 24 along a radial side edge 24a of the first fan-shaped plate 24, while a second fan-shaped plate 25 of the pair of fan-shaped plates 24, 25 has an extension 25b extending outward from the second fan-shaped plate 25 along a radial side edge 25a closer to the radial side edge 24a of the first fan-shaped plate 24.

Then the tip of the extension 24b of the first fan-shaped plate 24 is attached to a mounting shaft 26 extending horizontally in a radial direction from a peripheral wall of the flange 4b of the base shaft 4 so as to be rotatable around an axis of the mounting shaft 26, while the tip of the extension 25b of the second fan-shaped plate 25 is attached to a mounting shaft 27 extending radially from a side wall of the lower portion 21d of the elevating body 21 and parallel with the mounting shaft 26 so as to be rotatable around an axis of the mounting shaft 27.

Thereby the pair of fan-shaped plates 24, 25 rotate around the center (connection point) of each other in a vertical plane as the elevating body 21 moves up and down.

Furthermore, an angle scale S1 which corresponds to the tilt angle of the rocking body 7 is attached on a peripheral wall of the first fan-shaped plate 24, and a zero point scale S2 is attached on a peripheral wall of the second fan-shaped plate 25.

The angle scale S1 is pre-created as follows.

First, the elevating body 21 is fixed at the highest point thereof (the rocking body 7 takes the horizontal position), and a zero scale is assigned to a point of the angle scale S1 which corresponds to the zero point scale S2. Secondly, the tilt angle of the tilt position of the rocking body is measured and the measured value is assigned to a point of the angle scale S1 which corresponds to the zero point scale S2 each time the height of the elevating body 21 is changed.

In this way, the elevating body 21 is fixed at a height at which the angle indicated by the zero point scale S2 becomes a desired angle, and then one of four sides of the substrate 8 of the rocking body 7 is brought into contact with the upper surface of the elevating body 21. Thereby, the stage 2 (support rod 20) is rotated by the desired angle clockwise or counterclockwise around one of the horizontal two axes (X-Y axes) which extend through the center of the sphere 9 and are orthogonal to each other on the vertical axis.

Although the pair of fan-shaped plates 24, 25 is the extension 24b, 25b in this embodiment, the pair of fan-shaped plates 24, 2After5 may be attached directly to the associated mounting shafts 26, 27 at the tips of radial side edges 24a, 25a thereof so as to be rotatable around the axes of the mounting shafts 26, 27 without the extensions 24b, 25b.

Figure 5:
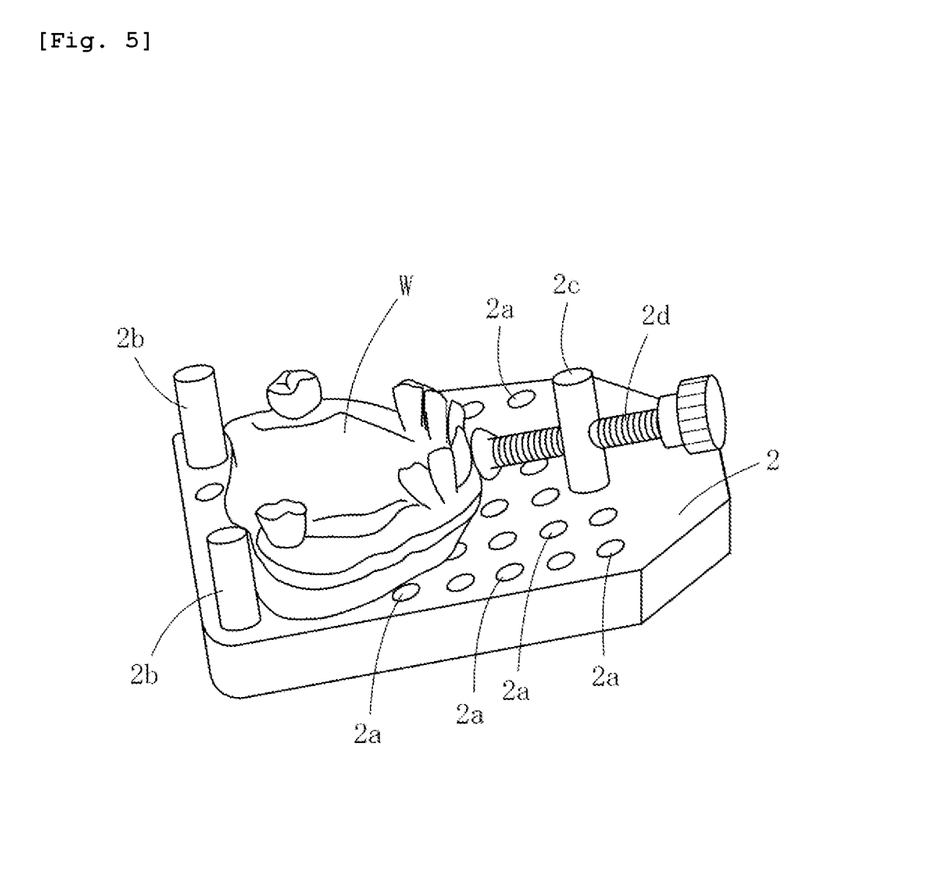
FIG. 5 is a perspective view of a stage of the angle adjustment stage device for dental technique shown in FIG. 1, where a workpiece for dental technique is fixed on the stage.

FIG. 5 is a perspective view of the stage 2 with the workpiece for dental technique W fixed thereon.

AS shown in FIG. 5, the stage 2 is formed in a flat plate shape and has holes 2a evenly spaced in longitudinal and width directions of the stage 2. A pair of receiving pins 2b, 2b and a tightening pin 2c provided with a clamping screw 2d are selectively fitted into any of these holes 2a.

Then the workpiece W is fixed on the stage 2 by clamping the workpiece W between the pair of receiving pins 2b, 2b and the clamping screw 2d.

In this embodiment, a marking unit 28 is provided to draw a line for design on the workpiece for dental technique W fixed on the stage 2.

The marking unit 28 includes a pole 29 projected vertically on the base 1, an arm 30 attached to the pole 29 and extending radially from the pole 29 and arranged on a plane perpendicular to the pole 29 so as to be rotatable around an axis of the pole 29, a pen holder 31 attached to the tip of the arm 30, and a pen 32 held by the pen holder 31 and extending downward from the pen holder 31 and parallel to the pole 29.

In this embodiment, the marking unit 28 is provided to draw the surveyor line on the plaster model because the angle adjustment stage device is intended to use for design of the clasp and removable partial denture and therefore the plaster model is assumed as a workpiece for dental technique W, but the workpiece for dental technique W is not limited to the plaster model. When the workpiece for dental technique W should be cut or polished, a suitable cutting or polishing unit is provided instead of the marking unit 28.

The angle adjustment stage device of the present invention may be used to locate an attachment and produce an implant stent and so on.

Next, a method of using the angle adjustment stage device of the present invention will be explained.

For example, when a surveyor line should be drawn on a plaster model for production of a removable partial denture, the plaster model as the workpiece for dental technique W is fixed on the stage 2. At this time, the ball plungers 15 of the substrate 8 of the rocking body 7 engage with the recesses 12b of the sphere holder 10 so that the plaster model W is located at a reference position (shown in FIG. 9(C)).

Next, the elevating body 21 is fixed at a height (highest point) where the zero point scale S2 of the angle display mechanism 23 coincides with the zero point of the angle scale S1.

Thereafter the fixing screws 19 of the rocking body 7 is loosen and the stage 2 (plaster model W) is tilted to the initial setting position while looking at the left and right balance of the plaster model W, and then the stage 2 is fixed at the initial setting position by tightening the fixing screws 19.

At the initial setting position, a baseline (circumferential line) is drawn on the plaster model W by the marking unit 28 (pen 32) while rotating the stage 2, the rocking body 7, the elevating body 21 and the base shaft 4 together around the vertical axis (L1 in FIG. 9(A)).

Thereafter, the clamp screw 22a of the set collar 22 is loosen, and the elevating body 21 is lowered until the zero point scale S2 of the angle display mechanism 23 coincides with 15 degrees on the angle scale S1, and then the elevating body 21 is fixed at the height by tightening the clamp screw 22a again.

Next, the stage 2 is located at the tilt position so as to be tilted to the left and right of the plaster model W (the stage 2 is rotated clockwise and counterclockwise around the X axis shown in FIG. 9(C)), and in each case, an inclined line (outline of clasp) is drawn on buccal ang lingual sides of the clasped tooth 35 of the plaster model W by the pen 32, while rotating the stage 2, the rocking body 7, the elevating body and the base shaft together around the vertical axis (L2 in FIG. 9(A)).

After that, the buccal and lingual sides balance between the baseline L1 and the outline of clasp L2 is checked by contrasting those lines. The work is completed when the balance is good, but, when the balance is not good, it is necessary to change (adjust) the initial setting position of the stage 2 and draw a new outline of clasp again.

A method of change (adjustment) of the initial setting position is as follows.

(1) The change (adjustment) of the initial setting position around the X axis or the Y axis in FIG. 9(C)

After the clamp screw 22*a* of the set collar 22 is loosen, the elevating body 21 is lowered to a desired angle while looking at the angle display mechanism 23, and the elevating body 21 is fixed at the desired angle by tightening the clamp screw 22*a*.

Thereafter the fixing screws 19 are loosen so that the fixation between the rocking body 7 and the sphere 9 is released. However, the inclination of the stage 2 is not changed because the sphere 9, which supports the stage 2, is magnetically coupled to the magnet 6 of the base shaft 4.

Then the free rocking body 7 is adjusted to the desired tilt angle with respect to the X axis or the Y axis by bringing the associated one side of the substrate 8 of the rocking body 7 into contact with the upper surface of the elevating body 21, and the sphere 9 is fixed to the rocking body 7 by the fixing screws 19. Next, the clamp screw 22*a* of the set collar 22 is loosen and the elevating body 21 is raised until the zero point scale S2 of the angle display mechanism 23 coincides with the zero point of the angle scale S1, so that the change (adjustment) of the initial setting position of the stage 2 is completed.

(2) The change (adjustment) of the initial setting position around an alpha (α) axis in FIG. 9(C)

The sphere holder 10 is rotated until the alpha (α) axis coincides with the X axis or the Y axis while setting the stage 2 in the initial setting position. After that, the change (adjustment) is completed by operating in the same way as the case (1).

After the change (adjustment) of the initial setting position of the stage 2 is completed, a predetermined angle is set again with respect to the plaster model W based on the new initial setting position, and then the outline of clasp L2 is drawn so that an ideal outline of clasp associated with a wire clasp.

According to the present invention, compared with the conventional angle adjustment stage device, the number of parts which make up the angle adjustment stage device is reduced, and the device configuration becomes easier, thereby device manufacturing costs are significantly reduced and the device can be miniaturized and the maintenance of the device also becomes easier.

In addition, the number of parts to be operated for adjusting the angle of the stage 2 is reduced and it is easy to operate those parts and therefore, even beginners can master the operation of the device in a short period of time.

Figure 6:
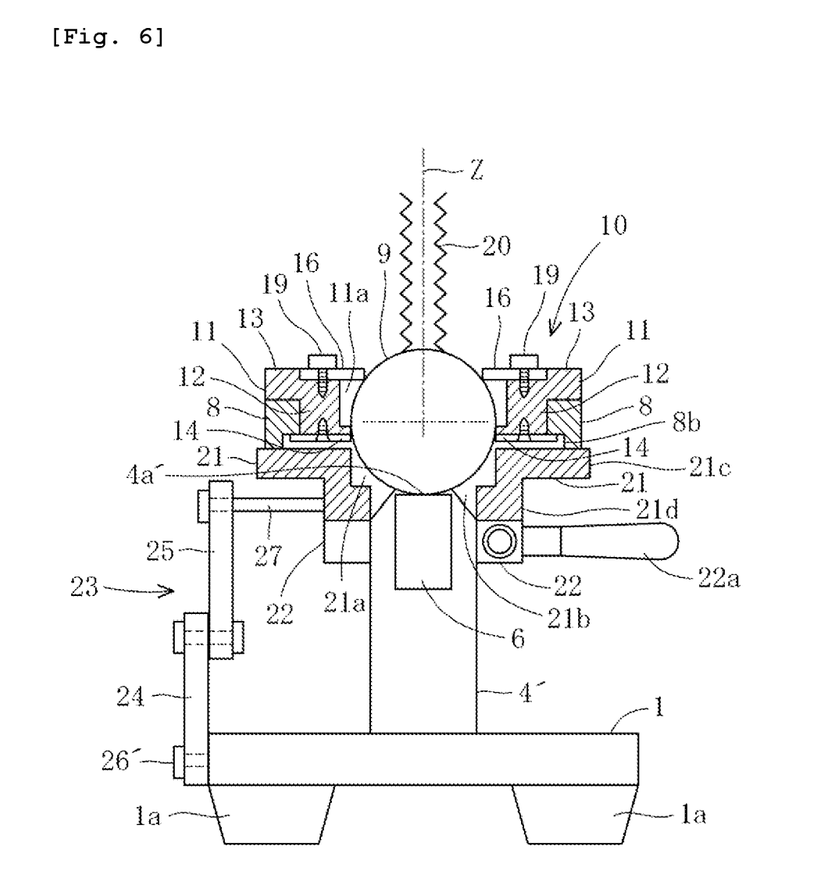
FIG. 6 is a longitudinal section of a stage support mechanism of an angle adjustment stage device for dental technique of another embodiment of the present invention.
Figure 7:
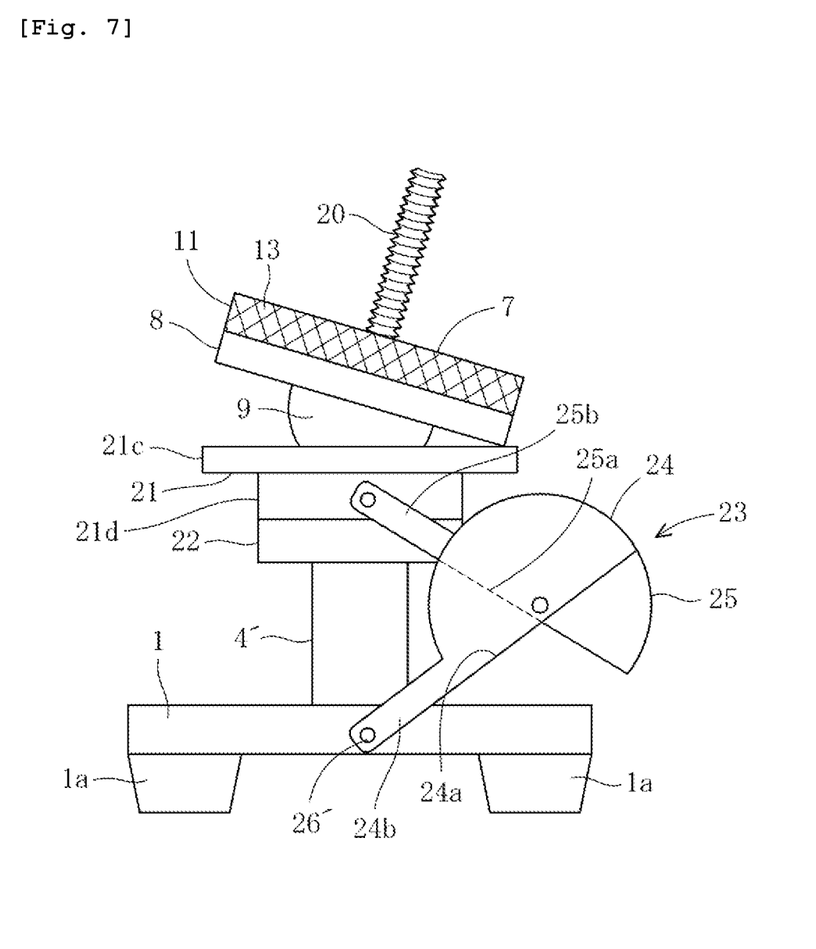
FIG. 7 is a side view of the angle adjustment stage device for dental technique shown in FIG. 6.

FIG. 6 is a longitudinal section of a stage support mechanism of an angle adjustment stage device for dental technique of another embodiment of the present invention, and FIG. 7 is a side view of the angle adjustment stage device for dental technique shown in FIG. 6.

The embodiment shown in FIGS. 6 and 7 differs from the embodiment shown in FIGS. 1 through 5 only in a mounting structure of the base shaft to the base and a mounting position of the angle display mechanism. Therefore, in FIGS. 6 and 7, the same elements as shown in FIGS. 1 through 5 are identified with the same reference numerals as used in FIGS. 1 through 5, and the detailed explanation thereof will be omitted in what follows.

Referring to FIGS. 6 and 7, in this embodiment, a base shaft 4' is fixed to the base 1 so as not to be rotatable around an axis thereof and has no flange.

The base shaft 4' has the magnet 6 therein, and an upper end surface of the magnet 6 is exposed on a bottom surface of a receiving portion 4*a*' which is formed at the tip of the base shaft 4' so as to receive the sphere 9.

Furthermore, the tip of the extension 25*b* of the second fan-shaped plate 25 of the angle display mechanism 23 is attached to the mounting shaft 27 of the elevating body 21 so as to be rotatable around the axis of the mounting shaft 27, while the tip of the extension 24*b* of the first fan-shaped plate 24 is attached to a mounting shaft 26', which is attached to the side of the base 1 and extends parallel to the mounting shaft 27, so as to be rotatable around an axis of the mounting shaft 26'.

Thereby, the pair of fan-shaped plates 24, 25 rotate around the center (connection point) of each other in a vertical plane as the elevating body 21 moves up and down.

According to this embodiment, the rotation of the stage 2 around the vertical axis in the initial setting position is performed by rotating the stage 2 and the rocking body 7 together around an axis Z while bringing the lower surface of the substrate 8 of the rocking body 7 into contact with the upper surface of the elevating body 21.

In addition, the rotation of the stage 2 around the vertical axis in the tilt position is performed by rotating the stage 2 and the rocking body 7 together around the receiving portion 4*a*' of the base shaft 4' as a pivot point while bringing the associated side of the substrate 8 into contact with the upper surface of the elevating body 21.

Although a preferred embodiment of the present invention has been explained, the present invention is not limited to the above-mentioned embodiment and one skilled in the art can easily create a variety of modifications within the scope of the attached claims.

For example, the sphere holder 10 may have any configuration as far as the sphere holder 10 is arranged at the center of the substrate 8 so as to be rotatable around the axis Z which extends through the center of the substrate 8 and perpendicular to the substrate 8.

For example, the angle display mechanism 23 may have any configuration as far as the angle display mechanism 23 displays a tilt angle at the tilt position of the rocking body depending on the height of the elevating body.

DESCRIPTION OF REFERENCE NUMERALS

1 Base
1*a* Rubber leg
2 Stage
2*a* Hole
2*b* Receiving pin
2*c* Tightening pin
3 Stage support mechanism
4, 4' Base shaft
4*a*, 4*a*' Receiving portion
5 Thrust bearing
6 Magnet
7 Rocking body
8 Substrate
8*a* First circular opening
8*b* First circular recess
9 Sphere
10 Sphere holder
11 Large diameter portion
11*a* Second circular recess 12 Small diameter portion
12a Second circular opening
13 Holder body
14 Annular member
15 Ball plunger (first stopper)
16 Sphere holding member
17 First screw hole
18 Second screw hole
19 Fixing screw
20 Support rod
21 Elevating body
21a Recess
21b Through hole
21c Upper portion
21d Lower portion
22 Set collar (second stopper)
22a Clamp screw
23 Angle display mechanism
24 First fan-shaped plate
24a Radial side edge
24b Extension
25 Second fan-shaped plate
25a Radial side edge
25b Extension
26, 26', 27 Mounting shaft
28 Marking unit
29 Pole
30 Arm
31 Pen holder
32 Pen
33 Removable partial denture
34 Artificial tooth
35 Clasped tooth
36 Clasp
37 Plaster model
38 Clasp tang
39 Clasp body
40 Clasp arm
40a Upper arm portion
40b Middle arm portion
40c Clasp tip
D1 Initial setting direction
D2 Tilt direction
L1 Baseline (circumferential line)
L2 Inclined line
M Plaster model
S1 Angle scale
S2 Zero point scale
W Workpiece for dental technique
Z Vertically extending axis

The invention claimed is:

1. An angle adjustment stage device for a dental technique comprising:
a base;
a stage arranged above the base, a workpiece for a dental technique being fixed on the stage;
a stage support mechanism provided on the base to support the stage in a manner such that a tilt angle of the stage is adjustable,
the stage support mechanism including
a base shaft arranged in protruding manner on the base and having a magnet therein,
a rocking body magnetically coupled to the tip of the base shaft,
a vertically slidable block fitted on the base shaft so as to vertically slide along the base shaft, and
a second stopper attached to the vertically slidable block and/or the base shaft for fixing the vertically slidable block to the base shaft at a desired height,
the rocking body including
a square substrate,
a sphere formed from ferromagnet,
a sphere holder arranged at the center of the square substrate so as to be rotatable around an axis which extends through the center of the square substrate and perpendicular to the square substrate,
a first stopper for fixing the sphere holder to the square substrate at a desired rotational position,
the sphere holder holding the sphere in a manner such that the sphere can be rotated around the center thereof and fixed at a desired rotational position while the center of the sphere is on the axis extending perpendicular to the square substrate,
a support rod extending radially from the sphere and connected to a lower surface of the stage at an upper end thereof, and
a lower portion of the sphere protruding from the underside of each of the sphere holder and the square substrate, the rocking body being magnetically coupled to a receiving portion of the tip of the base shaft at a lower end of the sphere,; and
an angle indicator configured to indicate a tilt angle of the rocking body,
wherein an upper surface of the vertically slidable block forms a horizontal plane and has a hollow for receiving the lower portion of the sphere, and a through hole is formed on a bottom surface of the hollow to reach a lower surface of the vertically slidable block, and the through hole has a diameter corresponding to a diameter of the base shaft so that the base shaft is inserted through the through hole,
wherein the rocking body takes a horizontal position when the vertically slidable block is located at the highest point to contact a lower surface of the square substrate of the rocking body at an upper surface thereof, while the rocking body takes a tilt position when one of four sides of the square substrate is brought into contact with the upper surface of the vertically slidable block after the vertically slidable block is lowered from the highest point while separating the upper surface thereof from the lower surface of the square substrate, and the angle indicator indicates a tilt angle of the rocking body at each tilt position of the rocking body while changing the height of the vertically slidable block.

2. The angle adjustment stage device for a dental technique according to claim 1, wherein a first circular depressed portion is formed at the center of the lower surface of the square substrate of the rocking body, and a first circular opening whose diameter is larger than a diameter of the sphere is formed at the center of a bottom surface of the first circular depressed portion to reach an upper surface of the square substrate,
wherein the sphere holder of the rocking body comprises a holder body having a large diameter portion whose diameter is larger than the diameter of the first circular opening, and a small diameter portion connecting coaxially to a lower end surface of large diameter portion and having a thickness which corresponds to a depth of the first circular opening and a diameter which corresponds to the diameter of the first circular opening, wherein a second circular depressed portion whose diameter is larger than the diameter of the sphere is formed at the center of an upper end surface of the large diameter portion, and a second circular opening is formed at the center of a bottom surface of the second circular depressed portion to reach a lower end surface of the small diameter portion and having a diameter which is smaller than the diameter of the sphere, wherein the sphere holder further comprises a first annular member having a thickness which is smaller than a depth of the first circular depressed portion, an outer diameter which is larger than the diameter of the first circular opening, but smaller than the diameter of the first circular depressed portion and an inner diameter which corresponds to the diameter of the second circular opening, wherein the first annular member is combined coaxially with the lower end surface of the small diameter portion while the small diameter portion is fitted into the first circular opening of the square substrate, and the holder body is attached to the square substrate so as to be rotatable around the axis extending perpendicular to the square substrate, wherein the sphere holder further comprises a second annular member having an outer diameter which equals to the diameter of the first circular opening and an inner diameter which is smaller than the diameter of the sphere, wherein first screw holes are formed at more than three positions which are spaced from each other in a circumferential direction of the second annular member so as to penetrate both end surfaces of the second annular member, while second screw holes are formed at positions corresponding to the first screw holes on a bottom surface of the second circular depressed portion of the holder body, and wherein the second annular member further comprises fixing screws being screwed into the first and second screw holes, the fixing screws being screwed into the first and second screw holes from the outside of the second annular member with the sphere nipped between the bottom surface of the second circular depressed portion of the holder body and the second annular member.

3. The angle adjustment stage device for a dental technique according to claim 2, wherein a plurality of dimples are formed on an outer peripheral surface of the small diameter portion of the holder body at equal distances, and at least one radial hole is formed at positions which correspond to the plurality of dimples on an inner wall of the first circular opening of the square substrate and extends radially outward from the axis extending perpendicular to the square substrate, and the first stopper consists of at least one ball plunger arranged in the at least one radial hole and elastically urged toward the outer peripheral surface of the small diameter portion to engage with the plurality of dimples of the small diameter portion.

4. The angle adjustment stage device for a dental technique according to claim 1, wherein the base shaft is rotatable around an axis thereof and has a flange at a lower portion thereof, wherein the angle indicator includes a pair of fan-shaped plates connected to each other so as to be rotatable around the center of each other, wherein the tip of a radial side edge of a first fan-shaped plate of the pair of fan-shaped plates or an extension extending outward from the first fan-shaped plate along the radial side edge is attached to the flange of the base shaft so as to be rotatable around a horizontal axis, wherein the tip of a radial side edge of a second fan-shaped plate of the pair of fan-shaped plates closer to the radial side edge of the first fan-shaped plate or an extension extending outward from the second fan-shaped plate along the radial side edge of the second fan-shaped plate is attached to a side wall of the vertically slidable block so as to be rotatable around an axis parallel to the horizontal axis, so that the pair of fan-shaped plates rotate around the center of each other in a vertical plane as the vertically slidable block moves up and down, and wherein an angle scale which corresponds to the tilt angle of the rocking body is attached on a peripheral wall of the first fan-shaped plate, and a zero point scale is attached on a peripheral wall of the second fan-shaped plate.

5. The angle adjustment stage device for a dental technique according to claim 1, wherein the base shaft is fixed to the base, and the angle indicator includes a pair of fan-shaped plates are connected to each other so as to be rotatable around the center of each other, wherein the tip of a radial side edge of a first fan-shaped plate of the pair of fan-shaped plates or an extension extending outward from the first fan-shaped plate along the radial side edge is attached to the base so as to be rotatable around a horizontal axis, wherein the tip of a radial side edge of a second fan-shaped plate of the pair of fan-shaped plates closer to the radial side edge of the first fan-shaped plate or an extension extending outward from the second fan-shaped plate along the radial side edge of the second fan-shaped plate is attached to a side wall of the vertically slidable block so as to be rotatable around an axis parallel to the horizontal axis, so that the pair of fan-shaped plates rotate around the center of each other in a vertical plane as the vertically slidable block moves up and down, and wherein an angle scale which corresponds to the tilt angle of the rocking body is attached on a peripheral wall of the first fan-shaped plate, and a zero point scale is attached on a peripheral wall of the second fan-shaped plate.

6. The angle adjustment stage device for a dental technique according to claim 1, further comprising a marking unit attached to the base so as to draw a line for design on the workpiece for a dental technique fixed on the stage, the marking unit including a pole projected vertically on the base, an arm attached to the pole and extending radially from the pole and arranged on a plane perpendicular to the pole so as to be rotatable around an axis of the pole, a pen holder attached to the tip of the arm, and a pen held by the pen holder and extending downward from the pen holder and parallel to the pole.

* * * * *